(12) United States Patent  
Slivka

(10) Patent No.: US 9,992,849 B1  
(45) Date of Patent: Jun. 5, 2018

(54) OVERVOLTAGE DETECTION IN A DIMMER

(71) Applicant: Crestron Electronics, Inc., Rockleigh, NJ (US)

(72) Inventor: Benjamin Slivka, Hillsdale, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days. days.

(21) Appl. No.: 15/677,158

(22) Filed: Aug. 15, 2017

(51) Int. Cl.
*H05B 37/02* (2006.01)

(52) U.S. Cl.
CPC ................ *H05B 37/0227* (2013.01)

(58) Field of Classification Search
CPC ............ H05B 37/0227; H05B 37/0245; H05B 37/0254; H05B 37/0272
USPC ........................ 315/127, 307, 224
See application file for complete search history.

(56) References Cited

U.S. PATENT DOCUMENTS

| | | | |
|---|---|---|---|
| 7,242,563 B2 | 7/2007 | Hua et al. | |
| 8,085,160 B2 | 12/2011 | Vanderzon | |
| 8,698,466 B2 | 4/2014 | Vanderzon | |
| 9,071,051 B2 | 6/2015 | Sagona | |
| 9,279,835 B2 | 3/2016 | Russell et al. | |
| 9,820,349 B2 * | 11/2017 | Shteynberg | H05B 33/083 |
| 9,867,263 B2 * | 1/2018 | Avrahamy | H05B 37/0272 |
| 2010/0201273 A1 * | 8/2010 | Thirugnanasambandham | H03K 17/0822 315/127 |
| 2010/0308738 A1 * | 12/2010 | Shteynberg | H05B 33/0812 315/185 R |
| 2012/0081009 A1 * | 4/2012 | Shteynberg | H05B 33/083 315/122 |
| 2013/0207548 A1 * | 8/2013 | Leshniak | H05B 33/0803 315/121 |

(Continued)

OTHER PUBLICATIONS

Allegro MicroSystems, LLC, ACS709 High-Bandwidth, Fast Fault Response Current Sensor IC in Thermally Enhanced Package, Jun. 5, 2017, available at www.allegromicro.com/en/Products/Current-Sensor-ICs/Zero-To-Fifty-Amp-Integrated-Conductor-Sensor-ICs/ACS709.aspx.

*Primary Examiner* — Douglas W Owens
*Assistant Examiner* — Syed M Kaiser
(74) *Attorney, Agent, or Firm* — Crestron Electronics, Inc.

(57) ABSTRACT

A dimmer circuit configured for detecting an overvoltage event comprising a controller, a plurality of dimming transistors, a current sensor, and an overvoltage protection device coupled across at least one of the plurality of dimming transistors. The dimmer circuit generates a transistor drive signal to drive the plurality of dimming transistors at a reverse phase dimming mode and provides a dimmed hot output signal to a load. After driving at least one of the dimming transistors to turn off, the dimmer circuit receives from the current sensor a detected current level (I) of the dimmed hot output signal at a turn off time threshold ($T_{th}$) and compares the detected current level (I) to a current threshold ($I_{th}$). The dimmer circuit detects an overvoltage event when the detected current level (I) is above the current threshold ($I_{th}$) because this indicates that the overvoltage protection has tripped.

25 Claims, 7 Drawing Sheets

(56) References Cited

U.S. PATENT DOCUMENTS

| | | | | |
|---|---|---|---|---|
| 2014/0042933 A1* | 2/2014 | Livschitz | ........... | H05B 33/0848 |
| | | | | 315/307 |
| 2015/0369618 A1* | 12/2015 | Barnard | ............. | H05B 37/0272 |
| | | | | 701/491 |
| 2016/0330808 A1* | 11/2016 | Brandt | ............... | H05B 33/0815 |
| 2017/0086281 A1* | 3/2017 | Avrahamy | ......... | H05B 37/0272 |
| 2017/0188420 A1* | 6/2017 | Kido | ..................... | H05B 33/089 |
| 2017/0265287 A1* | 9/2017 | Avrahamy | ......... | H05B 37/0272 |
| 2017/0293293 A1* | 10/2017 | Brownie | ............ | G05B 23/0275 |

\* cited by examiner

Forward-Phase – Voltage across Load

Reverse-Phase – Voltage across Load

Voltage across Dimmer for Reverse-Phase with Overvoltage Event

OVERVOLTAGE DETECTION IN A DIMMER

BACKGROUND OF THE INVENTION

Technical Field

The present invention relates generally to load control devices, and more specifically to a method for detecting an overvoltage event in a dimmer.

Background Art

Dimmers are used for varying light levels or intensity of lighting loads by controlling the amount of power that is delivered to the loads. Phase control dimming is one method of dimming lighting loads. Taking a sine waveform voltage signal, phase control dimming involves varying the amount of time voltage is applied to the load during a given half cycle. To dim the light to 50%, for example, power to the load may be provided for 50% of the half cycle and turned off during the remaining 50% of the half cycle.

Phase control dimming includes forward phase dimming (also called leading edge) and reverse phase dimming (also called trailing edge). During forward phase dimming, as shown in FIG. 7A, the dimmer turns off voltage during the front part of each half cycle (i.e., voltage turns off at zero crossing and turns on during the half cycle). In reverse phase dimming, as shown in FIG. 7B, the dimmer turns off voltage during the rear part of each half cycle (i.e., voltage turns on at zero crossing and turns off during the half cycle). Triode for alternating current (TRIAC) based dimmers can only dim in forward phase because they can only turn off when the current going through them goes to zero, which does not happen when dimming in reverse phase. On the other hand field-effect transistor (FET) based dimmers can dim in either forward or reverse phase.

While incandescent lighting loads can be dimmed in either phase, other types of lighting loads cannot. Inductive loads, for example, can only be dimmed in forward phase. If an inductive load were to be dimmed in reverse phase, when the voltage is turned off during the half cycle and the current is stopped abruptly, the voltage would spike to compensate. Such a voltage spike 704 is illustrated in FIG. 7C, which shows a voltage waveform across the dimmer for reverse phase. This occurrence is called an overvoltage event, which can cause failure of the dimmer circuit. Capacitive loads, on the other hand, may result in current spikes when dimmed in forward phase. As such, special care needs to be taken in selecting the right dimmer for the load type to avoid damage to the dimmer and/or the lighting load. Reverse phase dimmers may be used to dim incandescent loads, capacitive loads, electronic low voltage transformers, light emitting diode (LED) loads, and halogen lamps. Forward phase dimmers may be used to dim inductive loads, such as magnetic low voltage transformers, neon lights, or other inductive load types. In addition, some fluorescent lights, which are normally considered electronic low voltage loads, may seem inductive because they are optimized to work in forward phase. Forward phase dimmers can be used for incandescent loads as well, although generally reverse phase is preferred.

Universal dimmers have been introduced to obviate the need to select the right type of dimmer. Universal dimmers can dim in either forward or reverse phase using two FETs. Some dimmers allow their operating mode to be selected manually. Other dimmers use various detection circuit components to automatically determine whether to dim in forward or reverse phase. Devices that automatically detect load types on startup may do so improperly or have a load changed without a power cycle thus causing an overvoltage event to occur when dimming. Thus, many dimmers contain overvoltage detection circuits for detecting overvoltage events during run time. Such a dimmer may initially operate in reverse phase and upon detecting an overvoltage event (or a voltage spike) by the overvoltage detection circuit, automatically switch to the other dimming phase type. This is normally achieved with one of two methods.

One overvoltage detection circuit comprises a resistor divider across the FETs fed into a latching comparator with an accurate reference that is reset at the start of every half cycle. The comparator compares the voltage to a reference voltage and when the voltage exceeds that reference voltage the comparator will detect an overvoltage event and trigger a latch circuit. Either upon detecting an overvoltage event, or after detecting a predetermined number of overvoltage events, the dimmer will determine that an inductive load is connected and switch to a forward phase operation. However, this method adds additional circuitry with large components to the dimmer, including large sized resistors capable of absorbing high voltage spikes, a comparator, a latch circuit, and an accurate voltage reference.

Another overvoltage detection circuit requires a transient-voltage-suppression (TVS) crowbar circuit comprising a TVS diode, a resistor, and a diode from the FET drain to gate that feeds into a comparator prior to the diode to detect TVS break over. The TVS diode breaks over at a voltage that is high enough to prevent false trips but low enough to prevent FET damage. This solution requires two TVS, two signal diodes, a comparator latch, and a reference voltage. The two overvoltage detection circuits may also require an additional microcontroller to read the voltage, and a separate microcontroller for the user interface. An additional isolator may also be required to reach a microcontroller at a different potential.

In applications where the dimmer size needs to be small due to functional and esthetic reasons, for example in dimmers that need to fit inside a wall box, the addition of numerous additional and large components is undesired.

Accordingly, a need has arisen for a method for detecting an overvoltage event in a dimmer without the addition of excessive circuit components.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for detecting an overvoltage event in a universal lighting dimmer that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to an aspect of the embodiments a dimmer circuit configured for detecting an overvoltage event is provided. The dimmer circuit may comprise a plurality of dimming transistors configured for providing a dimmed hot output signal to a load, a current sensor configured for sensing a current level of the dimmed hot output signal, an overvoltage protection device configured for being triggered during an overvoltage event; and a controller. The controller may be configured for generating a transistor drive signal to drive the plurality of dimming transistors at a reverse phase dimming mode; after driving at least one of the dimming transistors to turn off, receiving from the current sensor a detected current level (I) of the dimmed hot output signal at a turn off time threshold ($T_{th}$); comparing the detected current level (I) to a current threshold ($I_{th}$); and detecting an overvoltage event when the detected current level (I) is above the current threshold ($I_{th}$).

According to an embodiment, a normal turn off time of the at least one of the dimming transistors is shorter than the turn off time threshold ($T_{th}$). The dimmer circuit may further comprise a plurality of resistor-capacitor circuits and drive impedance each coupled to one of the dimming transistors that dictate the normal turn off time of the coupled dimming transistor. The turn off time of the at least one of the dimming transistors during the overvoltage event may be longer than the turn off time threshold ($T_{th}$). During the overvoltage event, the overvoltage protection device prolongs the turn off time of the dimming transistor.

According to an embodiment, the controller may be further configured for receiving a command to dim the load at a dimming level, wherein the generated transistor drive signal corresponds to the dimming level. According to an embodiment, the controller may be coupled to the dimming transistors through an isolator. In addition, the controller may be coupled to the current sensor through an isolator. The current sensor may comprise a Hall Effect sensor, or another current sensor known in the art. According to an embodiment, the current sensor may be further configured for detecting an overcurrent event when a detected current level is above an overcurrent fault threshold.

According to various aspects of the embodiments, the plurality of dimming transistors may comprise field-effect transistors (FETs), metal oxide semiconductor field effect transistors (MOSFETs), n-channel negative-positive-negative (NPN) transistors, insulated-gate bipolar transistors (IGBT), any combinations thereof, or the like. According to various aspects of the embodiments, the overvoltage protection device may comprises a clamp circuit, a crowbar circuit, or the like. For example, the overvoltage protection device may comprise a varistor, a metal-oxide varistor (MOV), a transient voltage suppression (TVS) device, an active freewheeling path circuit, a thyristor surge protection device, a polymer electrostatic discharge (ESD) suppressor device, a gas discharge tube (GDT), any combinations thereof, or the like.

According to an embodiment, the controller may be further configured for: when the detected current level (I) is below the current threshold ($I_{th}$), continuing to dim the load in the reverse phase dimming mode. According to an embodiment, the controller may be further configured for: upon detecting the overvoltage event, switching to operate in a forward phase dimming mode. According to another embodiment, the controller may be further configured for: upon detecting the overvoltage event, issuing an error signal. Additionally, the controller may comprise a counter that counts the number of times the controller detects an overvoltage event.

According to another aspect of the embodiments, a dimmer circuit configured for detecting an overvoltage event is provided. The dimmer circuit comprises a plurality of dimming transistors coupled between a power source to receive a hot power signal and a load to provide a dimmed hot output signal; a current sensor coupled to the plurality of dimming transistors for sensing a current level of the dimmed hot output signal; an overvoltage protection device coupled to at least one of the plurality of dimming transistors and configured for being triggered during an overvoltage event; and a controller coupled to the plurality of dimming sensors and the current sensors. The controller may be configured for: generating a transistor drive signal that drives the plurality of dimming transistors at a reverse phase dimming mode; after driving at least one of the dimming transistors to turn off, receiving from the current sensor a detected current level (I) of the dimmed hot output signal at a turn off time threshold ($T_{th}$); comparing the detected current level (I) to a current threshold ($I_{th}$); and detecting an overvoltage event when the detected current level (I) is above the current threshold ($I_{th}$).

According to yet another aspect of the embodiments, a dimmer circuit configured for detecting an overvoltage event is provided. The dimmer circuit comprises a plurality of dimming transistors configured for providing a dimmed hot output signal to a load; a current sensor configured for sensing a current level of the dimmed hot output signal; an overvoltage protection device configured for being triggered during an overvoltage event; and a controller. The controller may be configured for: generating a transistor drive signal to drive the plurality of dimming transistors at a reverse phase dimming mode; after driving at least one of the dimming transistors to turn off, determining a turn off time of the at least one of the dimming transistors using at least one current level (I) detected by the current sensor; detecting no overvoltage event when the determined turn off time is shorter than a turn off time threshold ($T_{th}$); and detecting an overvoltage event when the determined turn off time is longer than the turn off time threshold ($T_{th}$).

According to a further aspect of the embodiments, a method for detecting an overvoltage event by a dimmer circuit is provided. The dimmer circuit comprises a plurality of dimming transistors, a current sensor, and an overvoltage protection device coupled across at least one of the plurality of dimming transistors. The method comprises the steps of: generating a transistor drive signal to drive the plurality of dimming transistors at a reverse phase dimming mode; providing a dimmed hot output signal to a load; after driving at least one of the dimming transistors to turn off, receiving from the current sensor a detected current level (I) of the dimmed hot output signal at a turn off time threshold ($T_{th}$); comparing the detected current level (I) to a current threshold ($I_{th}$); and detecting an overvoltage event when the detected current level (I) is above the current threshold ($I_{th}$).

The method may further comprise the step of: when the detected current level (I) is below the current threshold ($I_{th}$), continuing to dim the load in the reverse phase dimming mode. The method may also comprise the step of: upon detecting the overvoltage event, switching to operate in a forward phase dimming mode. In another embodiment, the method may also comprise the step of: upon detecting the overvoltage event, issuing an error signal.

According to another aspect of the embodiments, a method for detecting an overvoltage event by a dimmer circuit is provided. The dimmer circuit may comprise a plurality of dimming transistors, a current sensor, and an overvoltage protection device coupled across at least one of the plurality of dimming transistors.

The method may comprise the steps of: generating a transistor drive signal to drive the plurality of dimming transistors at a reverse phase dimming mode; providing a dimmed hot output signal to a load; after driving at least one of the dimming transistors to turn off, determining a turn off time of the at least one of the dimming transistors using at least one current level (I) detected by the current sensor; detecting no overvoltage event when the determined turn off time is shorter than a turn off time threshold ($T_{th}$); and detecting an overvoltage event when the determined turn off time is longer than the turn off time threshold ($T_{th}$).

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
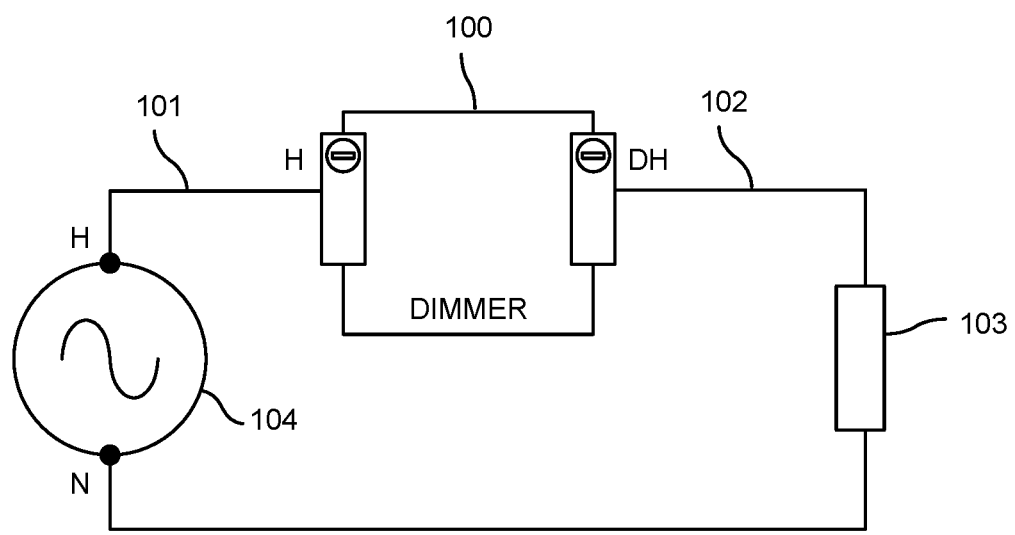

FIG. 1 shows a dimmer in accordance with an illustrative embodiment.

Figure 2:
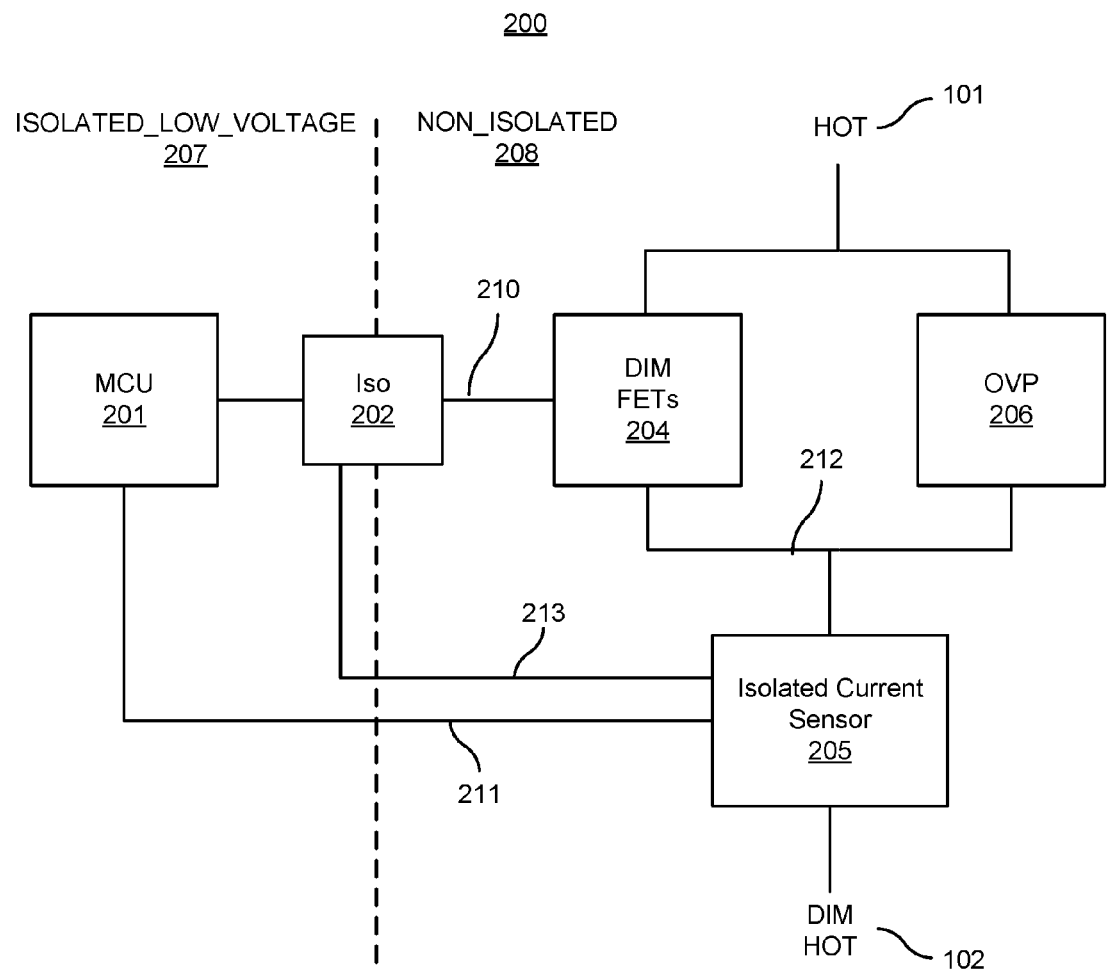

FIG. 2 shows a load control circuit of the dimmer in accordance with an illustrative embodiment.

Figure 3:
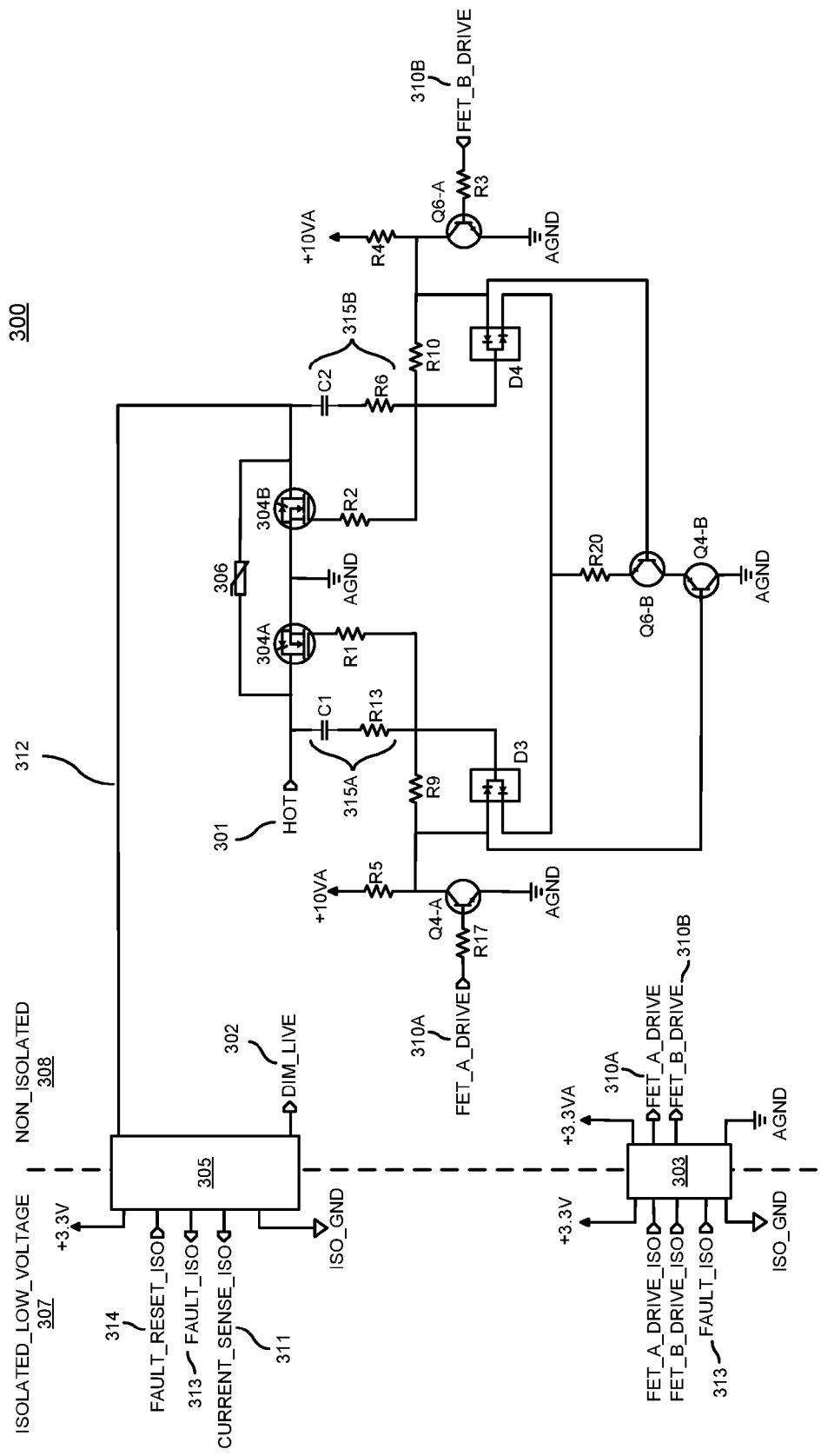

FIG. 3 shows a detailed load control circuit of the dimmer in accordance with an illustrative embodiment.

Figure 4:
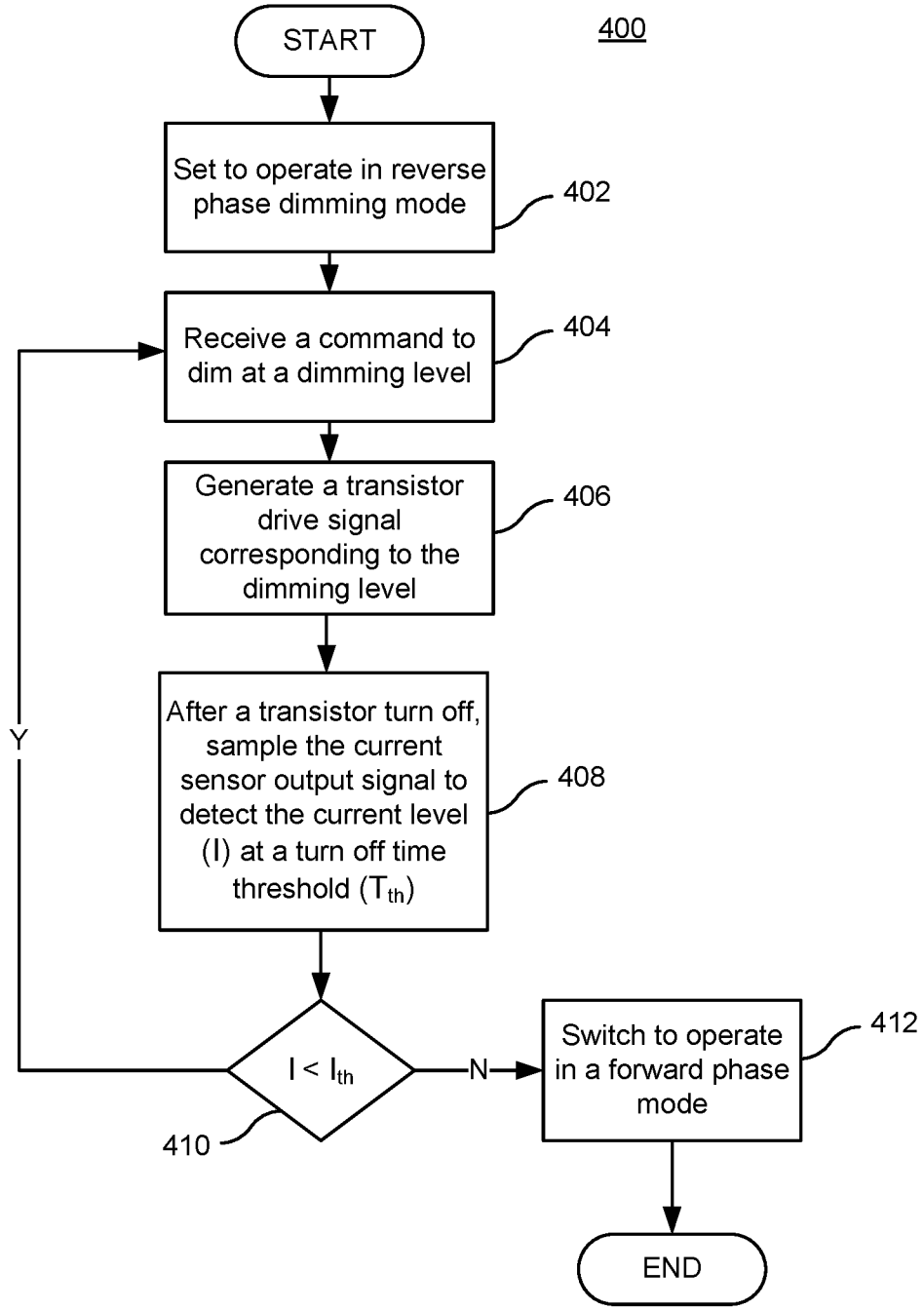

FIG. 4 shows a flowchart illustrating the steps for a method of detecting an overvoltage event in accordance with an illustrative embodiment.

Figure 5A:
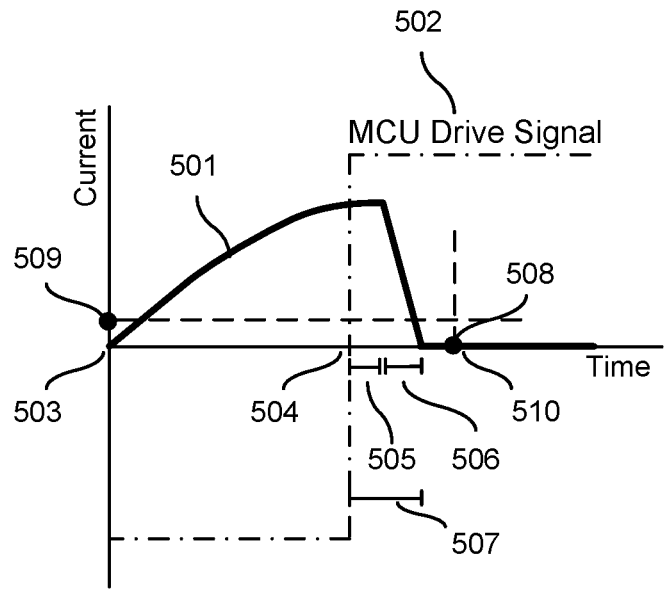

FIG. 5A shows an exemplary current waveform of a dimmed hot signal when the dimmer operates in a reverse phase mode and is connected to a non-inductive load in accordance with an illustrative embodiment.

Figure 5B:
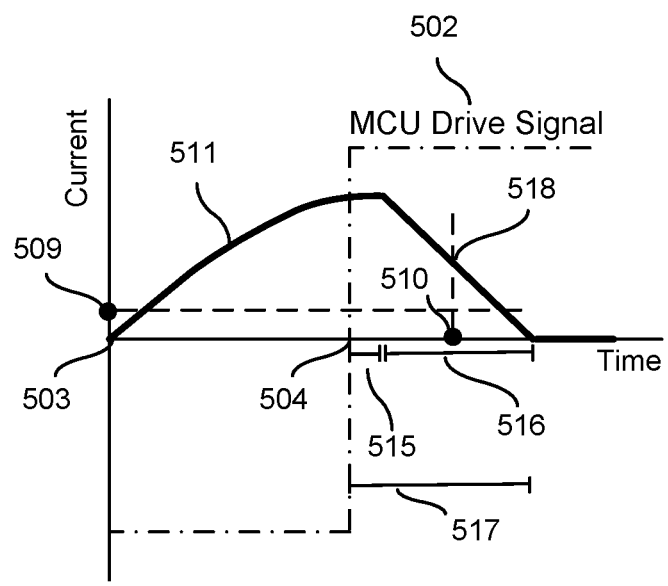

FIG. 5B shows an exemplary current waveform of a dimmed hot signal when the dimmer operates in a reverse phase mode and is connected to an inductive load in accordance with an illustrative embodiment.

Figure 6:
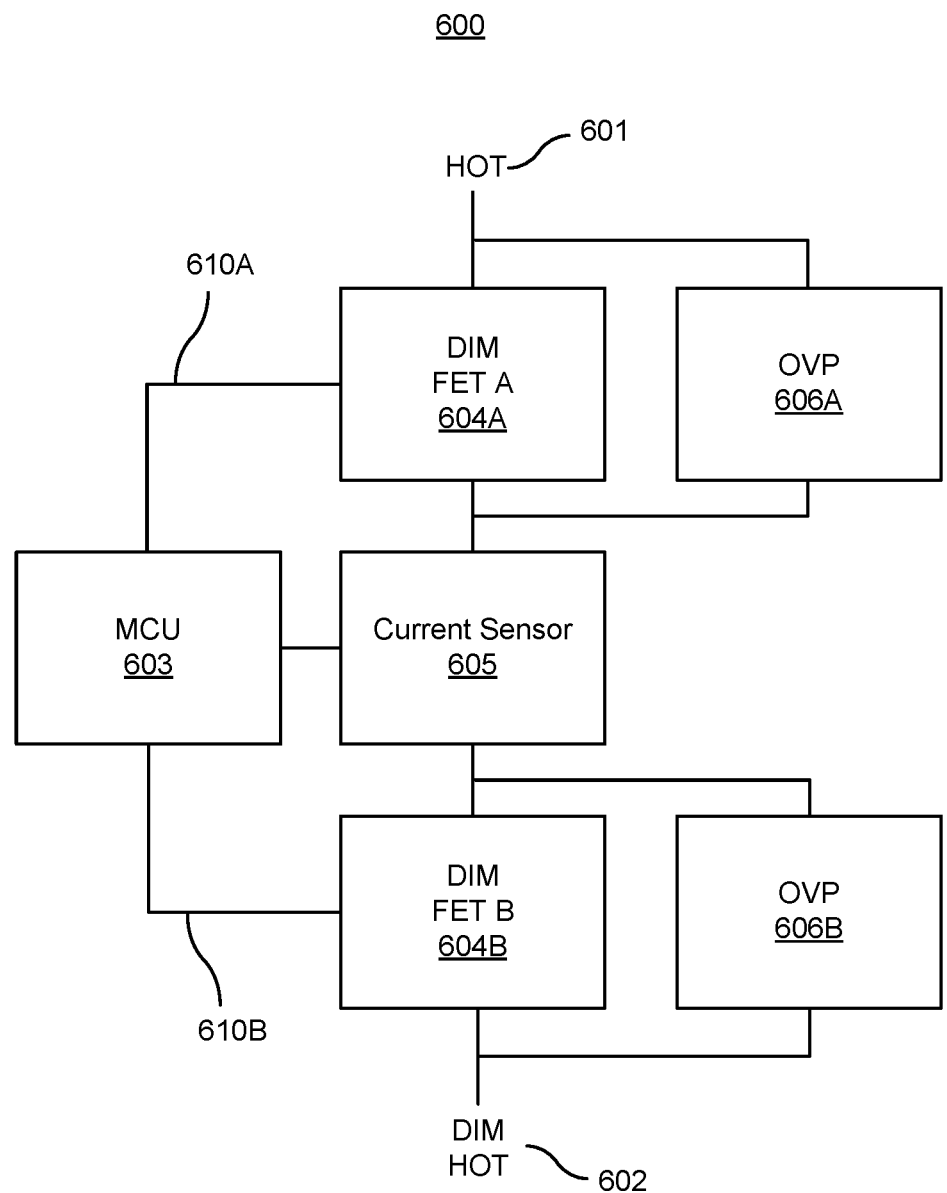

FIG. 6 shows a load control circuit of the dimmer in accordance with another illustrative embodiment.

Figure 7A:
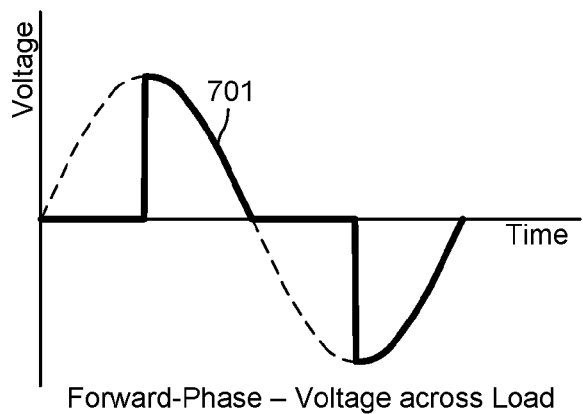

FIG. 7A shows an exemplary voltage waveform of a forward phase dimmed hot output signal across the load in accordance with an illustrative embodiment.

Figure 7B:
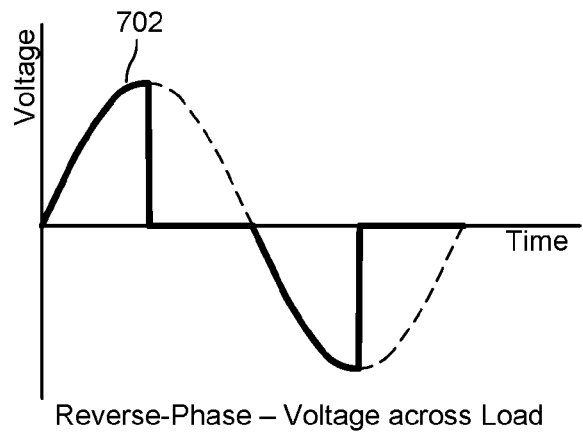

FIG. 7B shows an exemplary voltage waveform of a reverse phase dimmed hot output signal across the load in accordance with an illustrative embodiment.

Figure 7C:
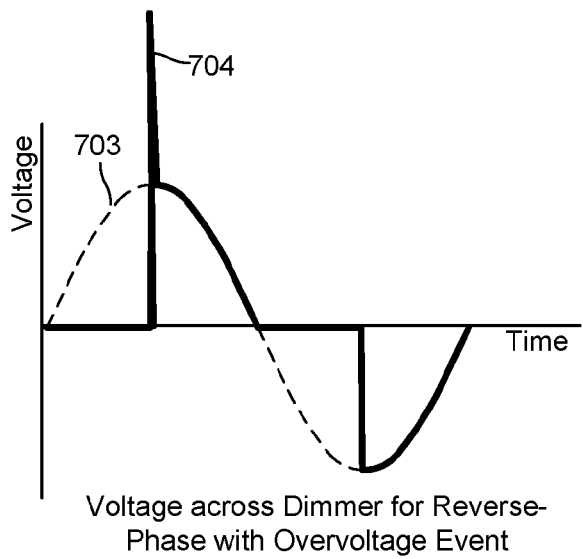

FIG. 7C shows an exemplary voltage waveform across the dimmer for reverse phase with an overvoltage event in accordance with an illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices described herein.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Dimmer
101 Alternating Current (AC) Power Hot Signal
102 Dimmed Hot Output Signal
103 Load
104 AC Power Source
200 Load Control Circuit
201 Microcontroller (MCU)
202 Isolator
204 Dimming Transistors
205 Isolated Current Sensor
206 Overvoltage Protection (OVP) Device
207 Low-Voltage Side
208 High-Voltage Side
210 Transistor Drive Signal
211 Current Sensor Output Signal
212 Dimmed Hot Signal
213 Overcurrent Output Signal
300 Load Control Circuit
301 AC Power Hot Signal
302 Dimmed Hot Output Signal or DIM_LIVE Signal
303 Isolator
304A Dimming FET Transistor
304B Dimming FET Transistor
305 Hall Effect Current Sensor
306 OVP Device
307 Low-Voltage Side
308 High-Voltage Side
310A FET_$A_{13}$DRIVE Signal
310B FET_$B_{13}$DRIVE Signal 311 Current Sensor Output Signal or CURRENT_SENSE Signal
312 Dimmed Hot Signal
313 FAULT Signal
314 FAULT_RESET Signal
315A Resistor-Capacitor (RC) Circuit
315B RC Circuit
400 Flowchart Illustrating the Steps for a Method of Detecting an Overvoltage Event
402-412 Steps of Flowchart 400
501 Current Waveform of a Dimmed Hot Signal
502 Square Voltage Waveform of a Transistor Drive Voltage Signal from MCU
503 Turn On Time
504 Turn Off Time
505 Delay Time Period
506 Turn Off Time Period
507 Total Turn Off Time Period
508 Detected Current Level (I)
509 Current Level Threshold ($I_{th}$)
510 Turn Off Time Threshold ($T_{th}$)
511 Current Waveform of the Dimmed Hot Signal
515 Delay Time Period
516 Turn Off Time Period
517 Total Turn Off Time Period
518 Detected Current Level (I)
600 Load Control Circuit
601 AC Power Hot Signal
602 Dimmed Hot Output Signal
603 MCU
605 Current Sensor
604A Dimming Transistor
604B Dimming Transistor
605 Current Sensor
606A OVP Device
606B OVP Device
610A Transistor Drive Signal
610B Transistor Drive Signal
701 Voltage Waveform of a Forward Phase Dimmed Hot Output Signal
702 Voltage Waveform of a Reverse Phase Dimmed Hot Output Signal
703 Voltage Waveform of a Reverse Phase Dimmed Hot Output Signal with an Overvoltage Event
704 Voltage Spike

LIST OF ACRONYMS USED IN THE SPECIFICATION IN ALPHABETICAL ORDER

The following is a list of the acronyms used in the specification in alphabetical order.
A/Amp Ampere
AC Alternating Current
ASIC Application Specific Integrated Circuit
C Capacitor
CMOS Complementary Metal-Oxide-Semiconductor
CPU Central Processing Unit
D Diode
DC Direct Current
EEPROM Electrically Erasable Programmable Read-Only Memory
ESD Electrostatic Discharge
FET Field-Effect Transistor
GDT Gas Discharge Tube
Hz Hertz
I Current
$I_{th}$ Current Threshold
IGBT Insulated-Gate Bipolar Transistor
LED Light Emitting Diode
MCU Microcontroller
MOSFET Metal Oxide Semiconductor Field Effect Transistor
MOV Metal-Oxide Varistor
NPN Negative-Positive-Negative
OVP Overvoltage Protection
PCB Printed Circuit Board
PNP Positive-Negative-Positive
Q Transistor
R Resistor
RAM Random-Access Memory
RC Resistor-Capacitor Circuit
ROM Read-Only Memory
$T_{th}$ Turn Off Time Threshold
TRIAC Triode for Alternating Current
TVS Transient-Voltage-Suppression
V Volt / Voltage

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics Inc., located in Rockleigh, N.J.

The different aspects of the embodiments described herein pertain to the context of load control devices, and more specifically to a method for detecting an overvoltage event in a dimmer, but is not limited thereto, except as may be set forth expressly in the appended claims. According to one embodiment, the dimmer may comprise a universal dimmer that can automatically switch from a reverse phase dimming mode to a forward phase dimming mode upon detecting an overvoltage event. An overvoltage event typically indicates that an inductive load is connected to the dimmer, which should be dimmed in a forward phase dimming mode. Accordingly, the universal dimmer described herein may provide dimming control to various types of loads. For example, the dimmer may dim the following loads in reverse phase: incandescent loads, capacitive loads, electronic low voltage transformers, light emitting diode (LED) loads, halogen lamps, or other types of non-inductive loads. The dimmer may switch to a forward phase mode upon detecting that an inductive load has been connected, such as magnetic low voltage transformers, neon lights, or other inductive load types. In another embodiment, the method described herein may be used for overvoltage detection in dimmer circuits not designed to control inductive loads—i.e., not capable of dimming in forward phase. In such circuits, the dimmer may issue error signals upon a detection of an overvoltage event when the dimmer is connected to an inductive load.

Beneficially, as described in greater detail below, the dimmer of the present embodiments is configured for detecting an overvoltage event in a transistor based phase control dimmers by measuring current levels with a current sensor that is already present on these types of dimmers for overcurrent detection and protection. The method also relies on existing overvoltage protection devices that break over or conduct during an overvoltage event to protect the dimmer and the load from voltage spikes or power surges. These overvoltage protection devices effectively prolong the turn off time of the dimming transistors when inductive loads are connected to the dimmer to a time beyond a normal turn off, which is detectable through the current sensor with a microcontroller (MCU). As such, the dimmer may be used for detecting overvoltage situations in transistor based phase dimmers without having to use any components used for detecting overvoltage events, such as a large resistor divider, a comparator, a latch circuit, additional MCUs, or large TVS circuits. Accordingly, the detection method described herein simplifies the dimmer circuit design, reduces the printed circuit board (PCB) real estate and thereby dimmer size, and saves cost.

FIG. 1 shows a dimmer 100 in accordance with an illustrative embodiment. The dimmer 100 may be connected in series with an alternating current (AC) power source 104, such as an AC mains power source, to receive electric AC power hot signal 101. In an embodiment of the invention, the AC power source 104 may comprise 120 Volt (V) 60 Hertz (Hz) AC mains residential power supply. In other embodiments, the AC power source may supply power at a different voltage or frequency. For example, in another embodiment, the AC power source may supply 220V 50 Hz AC mains power supply. The dimmer 100 may comprise a user interface (not shown), such as an actuator, a button, a touch screen, or the like, which receives an input from a user indicating the desired dimming level. According to another embodiment, the dimmer may be controlled remotely as well through a wired or wireless interface. The dimmer 100 may use this user input to produce dimmed hot output signal 102 to a load 103 at a particular voltage level corresponding to the desired dimming level. As discussed above, the load 103 may comprise an inductive or a non-inductive lighting load known in the art.

Referring now to FIG. 2, there is shown a load control or dimmer circuit 200 of dimmer 100 according to an illustrative embodiment. The load control circuit 200 may comprise a microcontroller (MCU) 201, an isolator 202, an isolated current sensor 205, dimming transistors 204, and an overvoltage protection (OVP) device 206. The load control circuit 200 may comprise additional circuit components known in the art for providing additional functions to the dimmer 100. For example, the load control circuit 200 may comprise a power supply (not shown) for converting the incoming AC power signal to a direct current (DC) power signal for powering the various components of the load control circuit 200, including the MCU 201.

The MCU 201 may comprise at least one central processing unit (CPU) that can represent one or more microprocessors, "general purpose" microprocessors, special purpose microprocessors, application specific integrated circuits (ASICs), or any combinations thereof. MCU 201 can provide processing capability to provide processing for one or more of the techniques and functions described herein. The MCU 201 may also comprise an internal memory, or be connected to an external memory, that can store data and executable code, such as volatile memory, nonvolatile memory, read-only memory (ROM), random-access memory (RAM), electrically erasable programmable read-only memory (EEPROM), flash memory, a hard disk drive, or other types of memory. The MCU 201 may also include a wired or wireless interface configured for receiving remote control.

According to an embodiment, dimming transistors 204 may comprise a pair of dimming transistors coupled in series in a common source configuration between the AC power source to receive AC power hot signal 101 and the dimmer output to provide the dimmed hot output signal 102 to the load 103. The dimming transistors 204 may be connected to the current senor 205 via dimmed hot signal 212. The dimming transistors 204 may be connected to the MCU 201 through a galvanic isolator 202 configured for galvanically isolating a high-voltage side 208 of the load control circuit 200 from the low-voltage side 207 of the load control circuit 200 for safety and to suppress electrical noise to protect the MCU 201 from line-voltage fluctuations. Isolator 202 may comprise a digital isolator having a semiconductor based isolation barrier, such as a complementary metal-oxide-semiconductor (CMOS). In another embodiment, isolator 202 may comprise a digital field-effect transistor (FET) driver, an optical isolator, or another type isolator known in the art.

Dimming transistors 204 may receive a transistor drive signal 210 from the MCU 201 directing each of the transistors 204 to be conductive or non-conductive for portion of a half-cycle of the AC power signal 101 to control the amount of power delivered to the connected load 103 as is known in the art. Dimming transistors 204 may comprise field-effect transistors (FETs), and more particularly n-channel metal oxide semiconductor field effect transistors (MOSFETs). Although the load control circuit 200 may also be implemented using other types of n-channel transistors, such as n-channel negative-positive-negative (NPN) type transistors, insulated-gate bipolar transistors (IGBT), or the like. Using other types of transistors, however, requires the addition of a freewheel diode.

The current sensor 205 may be connected between the dimming transistors 204 and the load 103. The current sensor 205 is configured for sensing the current level outputted from the dimming transistors 204 to the load 103. The current sensor 205 may be connected to the MCU 201 to transmit a current sensor output signal 211 containing the detected current levels. According to one embodiment, the current sensor 205 may be isolated from the MCU 201. The current sensor 205 may, for example, comprise a Hall Effect sensor. Although the current sensor 205 may alternatively comprise a current transformer, a current sense resistor with an analog isolator, or another type of current sensor known in the art. A Hall Effect current sensor is a sensor type that has both current detection and isolation included in the same component, with isolated inputs and output, allowing the Hall Effect current sensor to be used in applications requiring electrical isolation without the use of additional isolators. In another embodiment, an additional isolator (not shown) may be included between the current sensor 205 and the MCU 201 to provide isolation. According to yet another embodiment, the current sensor 205 may be directly connected to the MCU 201 and not be isolated from the MCU 201.

The current sensor 205 may also be connected to the gates of the dimming transistors 204, either directly or through isolator 202, to output an overcurrent output signal 213 to turn off the dimming transistors 204 upon detecting an overcurrent event. A current sensor 205 is typically included in a dimmer for detecting overcurrent events. It is used as an electronic circuit breaker. If there is a short circuits on the dimmed hot output signal 102, and the dimmer 100 starts to dim up, the current sensor 205 will detect a spike in the current. If the sensed current is above an overcurrent fault threshold, the current sensor 205 may generate an overcurrent output signal or drive signal 213 to turn the dimming transistors 204 off. Beneficially, according to the present embodiments, the current sensor 205 may also be used for detecting an overvoltage event in the dimmed hot output signal 102 without the addition of any components for detecting or measuring voltage, as will be described in greater detail below.

The load control circuit 200 further comprises an overvoltage protection (OVP) device 206 across of the dimming transistors 204. The OVP device 206 is configured for providing protection for the load control circuit 200 and the load 103 during overvoltage and overcurrent events. The OVP device 206 may comprise a crowbar that in a case of an overvoltage event may divert or shut down voltage spikes from the load control circuit 200 by having the dimming transistors 204 absorb the energy to clamp the voltage. In another embodiment, the OVP device 206 may comprise a clamp that during an overvoltage event may clamp the load control circuit 200 to a predetermined voltage value. This predetermined voltage value is defined by the voltage rating of the dimming transistors 204, which is typically 650V. According to various aspects of the embodiments, the OVP device 206 may comprise various types of OVP devices or combination of devices in a circuit, such as, but not limited to a varistor, a metal-oxide varistor (MOV), a transient voltage suppression (TVS) device, a thyristor surge protection device, a polymer electrostatic discharge (ESD) suppressor device, a gas discharge tube (GDT), any combinations thereof, or other OVP devices known in the art. The OVP device may also comprise an active freewheeling path located between the dimmed hot signal 212 and neutral (i.e., not across the dimming transistors 204). Such active freewheeling path may consist of back to back FETs that turn on and off based on the dimming transistor 204 and/or the AC line voltage. In another embodiment, the active freewheeling path could also consist of a thyristor (e.g., SIDAC, DIAC, or the like) that is triggered by overvoltage events, and which when triggered forces the dimming transistors 204 to turn off. Although other types of active freewheeling path devices may be used.

FIG. 6 shows another embodiment of a load control circuit 600 according to an illustrative embodiment. The load control circuit 600 may comprise an MCU 603, a current sensor 605, a pair of dimming transistors 604A and 604B, and a pair of overvoltage protection devices 606A and 606B. The pair of dimming transistors 604A and 604B may be coupled in series in a common source configuration and receive an AC power hot signal 601 from an AC power source and provide a dimmed hot output signal 602 to the load. The dimming transistors 604A and 604B may be directly connected to the MCU 603, without isolation, to receive transistor drive signals 610A and 610B, respectively. The current sensor 605 may be connected between the two dimming transistors 604A and 604B and directly to the MCU 601, without isolation, to provide current levels. The load control circuit 600 further comprises OVP devices 606A and 606B connected across each of the dimming transistors 604A and 604B, respectively. The load control circuit may comprise other configurations capable of providing forward or reverse phase dimming as well as current detection.

FIG. 3 shows an exemplary detailed load control circuit 300, similar to load control circuit 200, according to an illustrative embodiment. The MCU 201 (not shown) is located on the isolated low voltage side 307 of the circuit 300. It provides a transistor drive signal, including a FET_A_DRIVE signal 310A and FET_B_DRIVE signal 310B, to the gates of the pair of dimming FET transistors 304A and 304B, respectively, at the high voltage side 308 of the circuit 300 through isolator 303. The isolator 303 may output a voltage lower than required by the pair of dimming FET transistors 304A and 304B. For example, the isolator may provide 3.3V, while the dimming FET transistors 304A and 304B need about 6.5V to be able to turn on. Transistors Q4-A and Q6-A may be provided between the isolator 303 and the dimming FET transistors 304A and 304B, respectively, to vary the voltage between about 3.3V and about 10V.

The pair of dimming FET transistors 304A and 304B may be coupled in series in a common source configuration—the source of transistor 304A is connected to the source of transistor 304B. The drain of transistor 304A may be connected to the AC power source to receive AC power HOT signal 301 and the drain of transistor 304B may be connected to the Hall Effect current senor 305 to provide dimmed hot signal 312. The transistor drive signals 310A and 310B turn the dimming transistors 304A and 304B on and off to yield a dimmed hot output signal 302 of alternating polarity, as is understood by a person of ordinary skill in the art. For example, FET_A_DRIVE signal 310A may turn on transistor 304A for a portion of the positive half cycle and turn off transistor 304A for the remaining portion of the positive half cycle. FET_B_DRIVE signal 310B may turn on transistor 304B for a portion of the negative half cycle and turn off transistor 304B for the remaining portion of the negative half cycle. FIG. 7A illustrates an exemplary voltage waveform of a forward phase dimmed hot output signal 701 across the load and FIG. 7B illustrates an exemplary voltage waveform of a reverse phase dimmed hot output signal 702 across the load.

The OVP device 306 is connected across the pair of dimming FET transistors 304A and 304B at each of their drains. The Hall Effect current sensor 305 measures the current level of the dimmed hot signal 312 and provides a current sensor output signal or CURRENT_SENSE signal 311 containing the detected current level to the MCU 201. It also provides the dimmed hot output signal or DIM_LIVE signal 302 to the connected load 103. The current sensor 305 may also output a FAULT signal 313 through isolator 303 to turn off the dimming transistors 304A and 304B when the detected current exceeds an overcurrent fault threshold.

The MCU 201 may send a FAULT_RESET signal 314 to the current sensor 305 to reset the FAULT latch.

Two resistor-capacitor (RC) circuits 315A and 315B are connected to and provide feedback to the gate of each dimming FET transistor 304A and 304B. RC circuit 315A includes capacitor C1 and resistor R13 and RC circuit 315B includes capacitor C2 and resistor R6. The slew rate or transition time from an ON to OFF state of the dimming FET transistors 304A and 304B is dictated by respective RC circuits 315A and 315B in combination of the drive impedance, which is dictated by R5, R9, and R4, R10, as well as D3 and D4. Slew rate is the change of voltage per unit of time. The transition time may be directed by changing the values of the components in these RC circuits 315A and 315B.

Diode pairs D3 and D4 serve a dual purpose. The top diodes in the diode pairs D3 and D4 are provided to allow the turn on time and turn off time of dimming transistors 304A and 304B to be symmetrical. The bottom diode in the diode pairs D3 and D4 are fed to two positive-negativepositive (PNP) transistors Q6-B and Q4-B for overcurrent trip. When both of the dimming transistors 304A and 304B turn off at the same time, it is considered fast turn off for an overcurrent trip, which will cause transistors Q6-B and Q4-B to turn on. As a result, the FET drive bypasses the slew rate limiting resistors R9 and R10, and goes straight to the PNP transistors Q6-B and Q4-B through resistor R20.

Turning to FIG. 4, there is shown a flowchart 400 illustrating the steps for a method of detecting an overvoltage event in accordance with an illustrative embodiment. In step 402, the dimmer 100 is set to operate in a reverse phase dimming mode. The dimmer 100 may be set to operate in a reverse phase dimming mode as a default dimming mode. According to an embodiment, the dimmer 100 may be set to operate in a reverse phase dimming mode at startup, every time after power is removed from the dimmer 100, for example due to power outage or circuit breaker trip or turn off, disconnecting an airgap switch of the dimmer, or the like. For example, power may be removed from the dimmer 100 to change the connected load 103. In another embodiment, the dimmer 100 may be set to operate in a reverse phase dimming mode manually by the installer or the user via the user interface.

In step 404, the MCU 201 may receive a command to dim the connected load 103 at a desired dimming level. In response, in step 406, the MCU 201 may generate a transistor drive signal corresponding to the dimming level to drive the dimming transistors 204 in a reverse phase dimming mode. For example, the load control circuit 200 may generate the reverse phase dimmed hot output signal 702 shown in FIG. 7B at 50% dimming level.

In step 408, after a transistor turn off, during each half cycle, whether positive or negative, the MCU 201 will sample the current sensor output signal 211 from the current sensor 205 to detect the current level (I) at a turn off time threshold ($T_{th}$). Particularly, the current sensor 205 will measure the current level (I) outputted from the dimming transistors 204 at a turn off time threshold ($T_{th}$) after one of the dimming transistors 204 was directed to turn off during the reverse phase dimming mode.

Referring to FIG. 5A, there is shown an exemplary current waveform 501 of the dimmed hot signal 212 outputted from the dimming transistors 204 and measured by the current sensor 205 during a normal turn off of one of the dimming transistors 204 in reverse phase mode—in other words, when the dimmer 100 operate in reverse phase mode and is connected to a non-inductive load. Square voltage waveform 502 represents the transistor drive signal 210 from the MCU 201. Initially, the transistor drive voltage signal 502 turns one of the dimming transistors 204 on at the beginning of the half cycle at turn on time 503. Then, the transistor drive signal 210 turns the dimming transistor 204 off during the remainder of the half cycle at turn off time 504. Normally, it takes some delay time period 505 for the dimming transistor 204 to start turning off. For example, referring to FIG. 3, the capacitors inherently in the FET transistors 304A and 304B need to drain from gate to source through the drive impedances R9 and R10, as well as through R20 in the case of an overcurrent trip, from about 10V down to about 6V for the respective dimming transistor 304A or 304B to start turning off. This time period 505 may as an example be around 70 microseconds. Then, it will take the dimming transistor 204 a turn off time period 506 to actually turn fully off. This may for example take another 25 microseconds. Thus, 507 may represent the total turn off time period of the dimming transistor 204 during a normal turn off. For example, the total turn off time 507 may comprise about 95 microseconds. As an example, the turn off time threshold ($T_{th}$) 510 may comprise 130 microseconds. However, it should be understood that different overvoltage protection methods, different RC circuit combination, different drive resistors, and different inductance values will all yield different results in the turn off times and the threshold time value described herein.

The MCU 201 may sample the current sensor output signal 211 from the current sensor 205 to detect the current level (I) 508 at the turn off time threshold ($T_{th}$) 510 of about 130 microseconds after one of the dimming transistors 204 has turned off. For example, as shown in FIG. 5A, the current level (I) 508 at the turn off time threshold ($T_{th}$) 510 may be about zero.

Referring back to FIG. 4, in step 410, the MCU 201 will compare the detected current level (I) to a current threshold ($I_{th}$). According to an embodiment, the current threshold ($I_{th}$) may comprise 100 mA, or any value larger than about 100 mA.

If the detected current (I) from the current sensor 205 at the sampled turn off time threshold ($T_{th}$) is below the current threshold ($I_{th}$), then the MCU 201 will determine that the dimming transistor 204 is turning off normally—i.e., a non-inductive load is connected and no overvoltage event has occurred. For example, referring to FIG. 5A, the detected current level (I) 508 at the turn off time threshold ($T_{th}$) 510 of about zero is below the current level threshold ($I_{th}$) 509 of about 100 mA. Accordingly, during normal turn off, as shown in FIG. 5A, the dimming transistor 204 may turn fully off before reaching the turn off threshold ($T_{th}$) 510, indicating to the MCU 201 to keep dimming the load 103 in the reverse phase mode. The MCU 201 will thereby continue dimming in reverse phase and return to step 404 to receive the next dimming command.

If in step 410 the MCU 201 determines that the detected current (I) from the current sensor 205 at the sampled turn off time threshold ($T_{th}$) 510 is above the current threshold value ($I_{th}$), then the MCU 201 determines that an overvoltage event has occurred, indicating that an inductive load is connected.

Referring to FIG. 5B, there is shown an exemplary current waveform 511 of the dimmed hot signal 212 outputted from the dimming transistors 204 and measured by the current sensor 205 when the load control circuit 200 attempts to dim an inductive load in a reverse phase mode. Again, square voltage waveform 502 represents the transistor drive signal 210 from the MCU 201. When the transistor drive signal 210 turns one of the dimming transistors 204 off during the half cycle at time 504, it takes a similar delay time period 515, as delay time period 505, for example of about 70 microseconds, for the dimming transistor 204 to start turning off. However, as the dimming transistor 204 will start turning off, an overvoltage event typically occurs. Particularly, the dimming transistor 204 will try to keep the same slew rate while the voltage on the output 212 will ring up causing the OVP device 206 to break over, or conduct, triggering the current to flow through it. As such, the resulting slew rate will be defined by the voltage of the OVP device 206 and the amount of inductance in the load. This will prolong the amount of time it takes for the dimming transistor 204 to turn off during the reverse phase dimming. As shown in FIG. 5B, the resulting turn off time period 516 is significantly larger when an inductive load is connected. For example, turn off time period 516 may comprise 142 microseconds, and thus the total turn off time period 517 may take around 212 microseconds or more for an inductive turnoff.

The margin between the slew rates of a non-inductive load and of an inductive load, and thereby the time difference between their turn off time, is large enough to be detected through the current sensor 205, such that the MCU 201 can determine the type of load connected to the dimmer 100. The turn off threshold ($T_{th}$) value 510 resides within that margin. Referring to FIG. 3, this margin can be further increased or decreased by changing the values of the RC circuits 315A and 315B connected to the gate of each of the dimming transistors 304A and 304B and the drive impedances R5 and R9. The time delay can be shortened by increasing the size of the capacitor and reducing the size of the drive impedances R5 and R9. In addition, increasing the quantity of connected inductive loads does not increase detection time period. It actually reduces the detection time because the initial delay defined by the gate capacitance and gate drive resistor is shorter when the required drive voltage on the gate is higher. The required drive voltage on the gate is higher when the load is greater. Only increasing the per-load inductance will affect the detection time period.

Referring back to FIG. 5B, the detected current level (I) 518 at the turn off time threshold ($T_{th}$) 510 may for example comprise about 1A. The MCU 201 will therefore determine in step 410 that the detected current level (I) 518 at the turn off time threshold ($T_{th}$) 510 exceeds the current level threshold ($I_{th}$) 509 of about 100 mA. This would indicate to the MCU 201 that the OVP device 206 was triggered and that an overvoltage event has occurred. This further indicates that the load control circuit 200 is connected to an inductive load.

According to one embodiment, in a universal dimmer application, the MCU 201 may switch to operate in a forward phase mode in step 412. For example, the MCU 201 may generate a forward phase transistor drive signal shown in FIG. 7A to dim the connected load 103 at 50%. In another embodiment, in a dimmer designed to only dim in a reverse phase, the MCU 201 may issue an error signal indicating that an improper load is connected.

According to an embodiment, the MCU 201 may comprise a counter that counts the number of times the MCU 201 detects an overvoltage event. Before switching to the forward phase mode in step 412, the MCU 201 may continue to dim the connected load 103 in reverse phase until detecting a predetermined number of overvoltage events, for example, two or three consecutive, or non-consecutive, overvoltage events.

INDUSTRIAL APPLICABILITY

To solve the aforementioned problems, the aspects of the embodiments are directed towards a system, software, and a method for detecting an overvoltage event in a dimmer. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. A dimmer circuit configured for detecting an overvoltage event comprising;
   a plurality of dimming transistors configured for providing a dimmed hot output signal to a load;
   a current sensor configured for sensing a current level of the dimmed hot output signal;
   an overvoltage protection device configured for being triggered during an overvoltage event; and
   a controller configured for:
      generating a transistor drive signal to drive the plurality of dimming transistors at a reverse phase dimming mode;
      after driving at least one of the dimming transistors to turn off, receiving from the current sensor a detected current level (I) of the dimmed hot output signal at a turn off time threshold ($T_{th}$);
      comparing the detected current level (I) to a current threshold ($I_{th}$); and
      detecting an overvoltage event when the detected current level (I) is above the current threshold ($I_{th}$).

2. The dimmer circuit of claim 1, wherein a normal turn off time of the at least one of the dimming transistors is shorter than the turn off time threshold ($T_{th}$).

3. The dimmer circuit of claim 2 further comprising a plurality of resistor-capacitor circuits and drive impedance each coupled to one of the dimming transistors that dictate the normal turn off time of the coupled dimming transistor.

4. The dimmer circuit of claim 1, wherein a turn off time of the at least one of the dimming transistors during the overvoltage event is longer than the turn off time threshold ($T_{th}$).

5. The dimmer circuit of claim 4, wherein during the overvoltage event, the overvoltage protection device prolongs the turn off time of the dimming transistor.

6. The dimmer circuit of claim 1, wherein the controller is further configured for:
receiving a command to dim the load at a dimming level, wherein the generated transistor drive signal corresponds to the dimming level.

7. The dimmer circuit of claim 1, wherein the plurality of dimming transistors comprise at least one of field-effect transistors (FETs), metal oxide semiconductor field effect transistors (MOSFETs), n-channel negative-positive-negative (NPN) transistors, insulated-gate bipolar transistors (IGBT), and any combinations thereof.

8. The dimmer circuit of claim 1, wherein the controller is coupled to the dimming transistors through an isolator.

9. The dimmer circuit of claim 1, wherein the current sensor is further configured for detecting an overcurrent event when a detected current level is above an overcurrent fault threshold.

10. The dimmer circuit of claim 1, wherein the controller is coupled to the current sensor through an isolator.

11. The dimmer circuit of claim 1, wherein the current sensor comprises a Hall Effect sensor.

12. The dimmer circuit of claim 1, wherein the overvoltage protection device comprises a clamp circuit.

13. The dimmer circuit of claim 1, wherein the overvoltage protection device comprises a crowbar circuit.

14. The dimmer circuit of claim 1, wherein the overvoltage protection device comprises at least one of a varistor, a metal-oxide varistor (MOV), a transient voltage suppression (TVS) device, an active freewheeling path circuit, a thyristor surge protection device, a polymer electrostatic discharge (ESD) suppressor device, a gas discharge tube (GDT), and any combinations thereof.

15. The dimmer circuit of claim 1, wherein the controller is further configured for:
when the detected current level (I) is below the current threshold ($I_{th}$), continuing to dim the load in the reverse phase dimming mode.

16. The dimmer circuit of claim 1, wherein the controller is further configured for:
upon detecting the overvoltage event, switching to operate in a forward phase dimming mode.

17. The dimmer circuit of claim 1, wherein the controller is further configured for:
upon detecting the overvoltage event, issuing an error signal.

18. The dimmer circuit of claim 1, wherein the controller comprises a counter that counts the number of times the controller detects an overvoltage event.

19. A dimmer circuit configured for detecting an overvoltage event comprising:
a plurality of dimming transistors coupled between a power source to receive a hot power signal and a load to provide a dimmed hot output signal;
a current sensor coupled to the plurality of dimming transistors for sensing a current level of the dimmed hot output signal;
an overvoltage protection device coupled to at least one of the plurality of dimming transistors and configured for being triggered during an overvoltage event; and
a controller coupled to the plurality of dimming sensors and the current sensors and configured for:
generating a transistor drive signal that drives the plurality of dimming transistors at a reverse phase dimming mode;
after driving at least one of the dimming transistors to turn off, receiving from the current sensor a detected current level (I) of the dimmed hot output signal at a turn off time threshold ($T_{th}$);
comparing the detected current level (I) to a current threshold ($I_{th}$); and
detecting an overvoltage event when the detected current level (I) is above the current threshold ($I_{th}$).

20. A dimmer circuit configured for detecting an overvoltage event comprising:
a plurality of dimming transistors configured for providing a dimmed hot output signal to a load;
a current sensor configured for sensing a current level of the dimmed hot output signal;
an overvoltage protection device configured for being triggered during an overvoltage event; and
a controller configured for:
generating a transistor drive signal to drive the plurality of dimming transistors at a reverse phase dimming mode;
after driving at least one of the dimming transistors to turn off, determining a turn off time of the at least one of the dimming transistors using at least one current level (I) detected by the current sensor;
detecting no overvoltage event when the determined turn off time is shorter than a turn off time threshold ($T_{th}$); and
detecting an overvoltage event when the determined turn off time is longer than the turn off time threshold ($T_{th}$).

21. A method for detecting an overvoltage event by a dimmer circuit comprising a plurality of dimming transistors, a current sensor, and an overvoltage protection device coupled across at least one of the plurality of dimming transistors, the method comprising the steps of:
generating a transistor drive signal to drive the plurality of dimming transistors at a reverse phase dimming mode;
providing a dimmed hot output signal to a load;
after driving at least one of the dimming transistors to turn off, receiving from the current sensor a detected current level (I) of the dimmed hot output signal at a turn off time threshold ($T_{th}$);
comparing the detected current level (I) to a current threshold ($I_{th}$), and
detecting an overvoltage event when the detected current level (I) is above the current threshold ($I_{th}$).

22. The method of claim 21, further comprising the step of:
when the detected current level (I) is below the current threshold ($I_{th}$), continuing to dim the load in the reverse phase dimming mode.

23. The method of claim 21, further comprising the step of:
upon detecting the overvoltage event, switching to operate in a forward phase dimming mode.

24. The method of claim 21, further comprising the step of:
upon detecting the overvoltage event, issuing an error signal.

25. A method for detecting an overvoltage event by a dimmer circuit comprising a plurality of dimming transistors, a current sensor, and an overvoltage protection device coupled across at least one of the plurality of dimming transistors, the method comprising the steps of:
- generating a transistor drive signal to drive the plurality of dimming transistors at a reverse phase dimming mode;
- providing a dimmed hot output signal to a load;
- after driving at least one of the dimming transistors to turn off, determining a turn off time of the at least one of the dimming transistors using at least one current level (I) detected by the current sensor;
- detecting no overvoltage event when the determined turn off time is shorter than a turn off time threshold ($T_{th}$); and
- detecting an overvoltage event when the determined turn off time is longer than the turn off time threshold ($T_{th}$).

* * * * *